Fig. 1
Fig. 2  Fig. 3
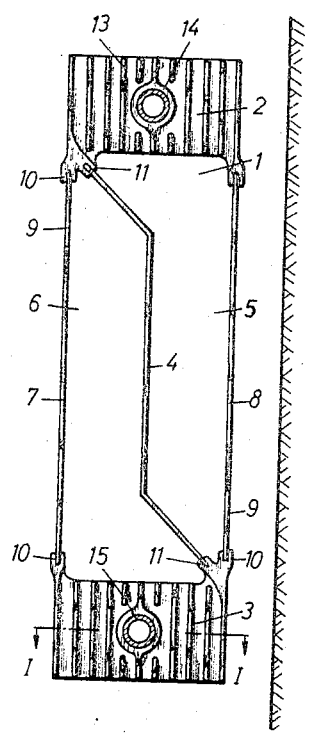
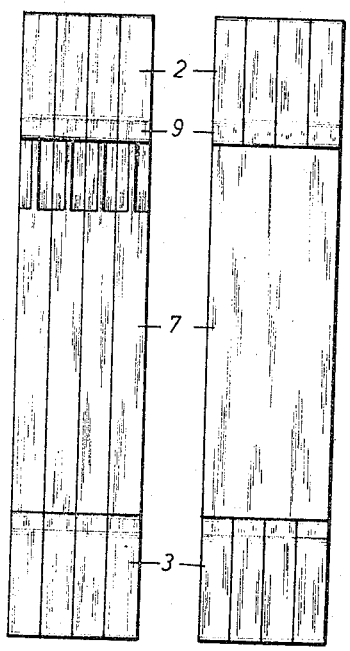
Fig. 4
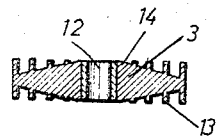

United States Patent Office
3,426,840
Patented Feb. 11, 1969

3,426,840
SPACE HEATER AND HEATING UNITS
Karl Heinz Markowz, 18 Gutentag-Loben-Strasse,
5657 Haan, Rhineland, Germany
Filed Nov. 14, 1966, Ser. No. 594,277
Claims priority, application Germany, Nov. 13, 1965,
M 67,260
U.S. Cl. 165—131                          9 Claims
Int. Cl. F24h 3/00

ABSTRACT OF THE DISCLOSURE

The invention concerns a space heater and its units. Regarding the space units that form the heater, each heating unit is for use together with similar heating units in a row forming a space heater adjacent a build-wall, and has an upper and a lower heating element spaced apart from each other, said upper and lower heating elements being similar to each other and being heatable, two heat conducting and heat radiating outer walls connected to said heating elements and defining therewith an air chamber, a partition dividing said chamber substantially diagonally into two chamber parts, one of said outer walls being adapted to face the interior of the space to be heated and having in its upper one-third portion air outlet means for said chamber, and the other outer wall being adapted to be disposed near said building wall and having in its lower one-third portion air inlet means for said chamber.

---

The invention relates to space heating, and relates more particularly to space heaters and their units, each heater being made by arranging in a row a series of the heating units. Still more particularly, the invention relates to a space heating unit and to a heater formed by uniting several heating units, and each heating unit comprises two heating elements which are either substantially identical, or similar, and which combine the advantages of radiator heating units with those of convection heater units omitting, however, the disadvantages inherent in either system.

A customary division of heating systems is in accordance with the type of heat transferral, and distinguishes between convection heaters, radiation heaters, air heater and combined heaters. If one starts with the human sensation temperature which lies approximately at 19° C. between the air space temperature and the median temperature of all the surfaces surrounding the air space, then one approximates an ideal condition with the use of a low temperature radiation heating; that ideal condition being that the air space temperature, the median temperature of the surrounding surfaces and the human sensation temperature are all alike. In such an ideal condition, the loss of heat by the human body through perspiration is reduced, an da steady comfort is rendered possible.

The most adverse values in this respect are found in air heating systems, because they transfer about 95 percent of the heat by convection, thus in a physiological undesirable manner; even radiators give off up to 75 percent of the heat by convection and only about 25 percent by radiation.

For the practical use of heaters, however, the following additional criteria need to be considered: The life of the equipment, the danger of internal and/or external corrosion, the applicability for various heat carriers, such as hot water and/or high temperature hot water, maximum running temperature, maximum operating pressure, applicability for low pressure steam operation and/or high pressure steam operation, volume of water, regulating ability, heating-up period, ratio between radiation and convection, weight of the equipment, possibility for cleaning the equipment, external surface temperature at maximum internal temperature, possibilities for changes at the construction side, resistivity during mounting, transport and operation; and price.

It is known to use heating units which include a lower or foot heating element and an upper or head heating element. Both heating elements are to a large extent similar to each other. They are connected by tubes, as shown in the Austrian Patent No. 234,964. Heating elements are also known, and heating units utilizing these elements, wherein each element includes a ribbed body through which there flows the heat carrier.

It is among the principal objects of the invention to provide space heating means which avoid the drawbacks of the prior art and which present in view of the aforesaid drawbacks and criteria optimal heat transfer conditions for space heating for human comfort.

It is another object of the invention to provide heaters composed of heating units that have a high percentage of heat transfer by radiation.

It is a further object of the invention to provide such space units and heaters in which similar or substantially identical space heating elements are spaced apart from each other in each unit and define with heat conducting and guiding outer walls a partitioned chamber.

Further objects and advantages of the invention will be set forth in part in the following specification and in part will be obvious therefrom without being specifically referred to, the same being realized and attained as pointed out in the claims hereof.

For a fuller understanding of the nature and objects of the invention, reference should be had to the following detailed description, taken in connection with the accompanying drawings, in which:

FIG. 1 is a side elevational view, partly in section, of a heating unit in accordance with an embodiment of the invention, showing it in the space to be heated and adjacent the building wall that terminates the space;

FIG. 2 is an end elevational view, seen from the left of FIG. 1, of a heater composed of several heating units of the type shown in FIG. 1, showing the units also in end elevation;

FIG. 3 is an end elevational view of a heater similar to FIG. 2, but embodying a modification;

FIG. 4 is a sectional view taken on the line I—I of FIG. 1;

Figure 5:
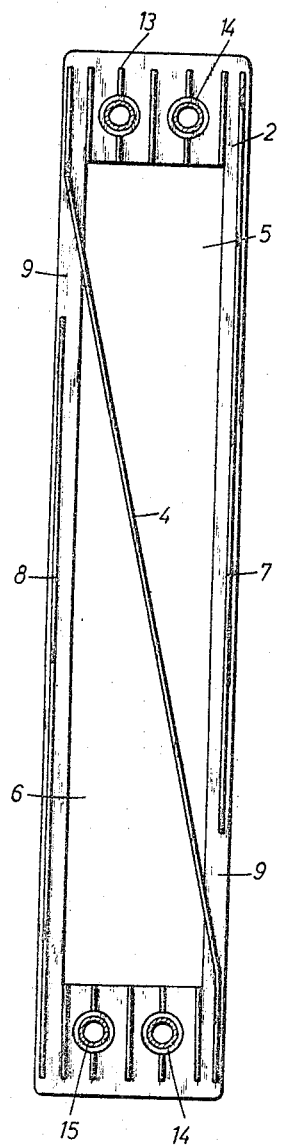
FIG. 5 is a side elevational view, partly in section, similar to FIG. 1, but embodying a further modification.

In carrying the invention into effect in the embodiments which have been selected for illustration in the accompanying drawings and for description in this specification, and referring now particularly to FIGS. 1 and 4, there is provided a heating unit that comprises an upper or head heating element 2 and spaced apart therefrom and below the same a lower or foot element 3. Two outer walls 7 and 8 are connected to the heating elements 2 and 3 and define therewith an internal chamber 1. The outer wall 7 faces towards the space to be heated, while the outer wall 8 is disposed adjacent the building wall (see FIG. 1) that terminates the space in which the heating unit and heater that is made of several units are positioned.

As previously mentioned, each heater is composed of several heating units put together in a row. As best shown in FIG. 2, an outer wall 7 in strip form is provided for each unit. Similarly (though not shown in detail), the outer walls 8 are also in strip form on each heating unit. The strips 7 of FIG. 2 together form one outer wall of the united chamber, and the united strips 8 similarly form the opposite wall of the united chamber that is formed of the row of individual chambers 1 of the individual units.

As best shown in FIG. 3, however, these outer walls 7 (and 8) may be in one piece instead of being strips for each individual heating unit, thus providing for a one-piece outer wall facing the space, and another one-piece outer wall 8 facing the building wall. In both cases, namely in FIGS. 2 and 3, the upper and lower elements 2 and 3, nevertheless, are individual elements that are arranged side by side.

Partition means are provided in each heating unit chamber 1, such as a partition 4, that divides each chamber 1 substantially diagonally. The partition 4 may be of angular form being bent or curved, and divides the chamber 1 into two substantially equal chamber parts 5 and 6. The chamber part 6 faces the interior of the space to be heated, while the chamber part 5 is not far from the external building wall.

The outer walls 7 and 8 are apertured, for instance as shown in FIG. 1 at 9. As shown in FIG. 1, the apertures 9 of the outer wall 7 are in the upper one-third thereof, while in the outer wall 8 they are in the lower one-third thereof.

It is, however, possible to provide the outer walls 7 and 8, instead, throughout with apertures (not shown). The partition 4 and the outer walls 7 and 8 are connected to the heating elements 2 and 3 by means of grooved-type or claw-type recesses 10, 11. The connection is rendered heat conductive, for instance either by rolling-in, or by brazing, welding, or cementing.

Heating units of this type and heaters formed thereby, owing to their specific constructions, permit a particularly advantageous utilization of the thermal energy that is imparted to the heater. Both the upper and lower elements 2 and 3, respectively, are penetrated by a tube 15 that conducts a heat carrier, such as hot water, steam, or the like, as previously mentioned. Usually, each upper element 2 surrounds a tube 15, the carrier of which has a higher temperature than the tube 15 that is surrounded by each lower element 3. Thus, the tube 15 of the upper heating elements 2 may be a boiler or riser tube, and of the lower element 3 a downcomer tube. Therefore, each upper heating element 2 will usually be heated to a higher temperature than each lower heating element 3.

Each of the upper and lower elements 2 and 3 is provided with solid ribs or fins 13 that extend in a direction of the flow of the heat carrier in the respective tube 15. The ribs 13 are spaced apart from each other, and serve to conduct and to radiate heat, and to conduct the streams of air that need to be heated, as explained below.

Each element, as best shown in FIG. 4, has at least one hub 14 that surrounds a passage 12, that is in close body contact with the external surface of the respective tube 15, and thereby is tightly and heat conductively connected thereto. The hub 14 is thicker than the remainder of the body of its respective element.

Figure 6:
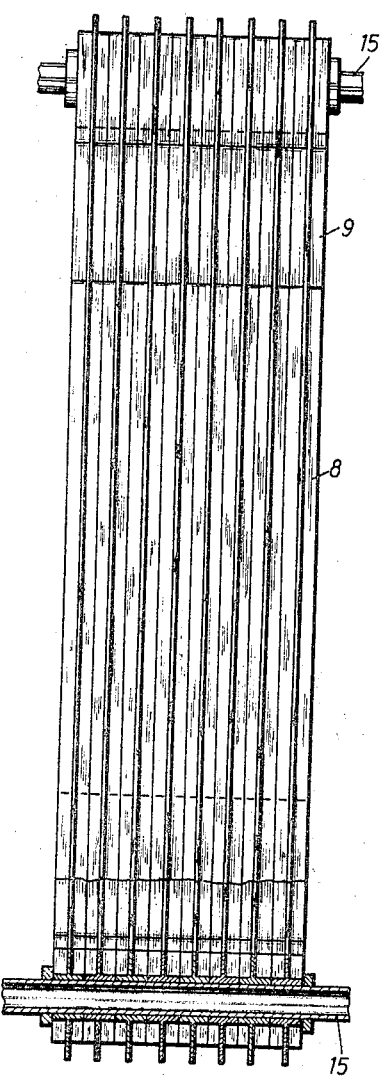
FIG. 6 is an end elevational view, seen from the left of FIG. 5, partly in section, showing a heater composed of several units of the type of FIG. 5, but shown in FIG. 6 in end elevation.

The heater is put together by joining in a row the aforesaid individual heating units (see FIGS. 2, 3, 6). The units may be interconnected by means of nipples, welding, or by the aforesaid heat carrier tube 15 that is substantially centrally disposed in the elements 2 and 3 (see FIG. 1) and is inserted and engaged by the passages 12 of the elements 2, 3 of the respective units. Preferably, this tube is made of copper.

When the individual units are put together, as previously mentioned, the outer walls 7 and 8 may be composed of through-going, apertured sheet metal which extends throughout the entire width of the heater.

In FIGS. 2 and 3, only a small number of heating units have been shown for each heater. This number may be increased, for instance as shown in FIG. 6, or decreased, as the needs require.

Furthermore, each heating element 2, 3, as shown in FIG. 5, may have two hubs 14 and apertures 12 and, correspondingly, engage two heat carrier conduit tubes 15.

The operation is as follows: The boiler tube 15 in the upper heating elements 2 imparts a higher temperature to these heating elements than the temperature imparted by the downcomer tubes 15 to the lower heating elements 3. Accordingly, the chamber part 5 that is assigned and leads upwardly to the upper heating elements 2 receives through its aperture or apertures 9 from a spot adjacent the external building wall the coldest air. That coldest air in a first stream will be pre-heated in the chamber part 5 by the partitions 4 and the outer wall or walls 8 to a certain temperature and at said certain temperature will then be conducted to the upper heating elements 2. Subsequently, it will leave these upper elements through the interstices between the ribs 13 of the elements 2 at a pre-determined exit temperature.

The lower heating elements 3, on the other hand, receive a second stream of air, namely off the floor (not shown) of the space to be heated; that air, however, is not as cold as the first air stream that had entered the chamber part 5. The second air stream will pass through the interstices between the ribs 13 of the lower units 3 into the chamber part 6 which, lie the chamber part 5, is pre-heated by the partitions 4 and the outer wall or walls 7. The second air stream will leave the chamber part 6 through the upper aperture(s) 9 of the outer wall or walls 7 thereof at practically the same exit temperature as that of the aforesaid first stream.

The instant invention provides for either a welded sheet metal construction, as well as alternatively for a cast construction. The latter is shown in FIGS. 5 and 6, where the same reference numerals have been used to indicate the parts similar to those of FIGS. 1–4. Lastly, the invention lends itself to a combination of cast and wrought parts. For instance, a particularly desirable construction provides for the upper and lower heating elements 2, 3 to be cast of light weight metal, but the outer walls 7 and 8 to be made of rolled light metal, preferably of high heat conductive aluminum or aluminum alloy.

The advantages of the instant invention are manifold, as the instant heating units, and hence heaters made therefrom, are of superior construction as compared to previously known devices.

The instant invention is usable for all water systems, namely for hot water and high temperature water systems, the latter for operating temperatures up to about 180° C.; and yet even at the higher temperatures, there occurs no hazard of dust carbonization, nor of skin burning upon touching. Similarly, the instant invention may be used in connection with high pressure steam, as well as low pressure steam.

The rate of water volume is particularly low. While a cast radiator of present construction requires about 4.40 liters per square meter of heating surface, and a tubular radiator of present construction requires about 7.75 liters per square meter of heating surface, a heater of the instant construction requires but about .5 liter per square meter of heating surface. This low water requirement ratio brings about the further advantage of a very short heating-up period, and a highly elastic regulatability. The small water volume ratio also offers the advantage of protecting the boiler from flue gas corrosion, which is a typical occurrence where the flue gases are undercooled; this undercooling is, however, avoided in accordance with the present invention, because the heat carrier returns quicker at a higher return temperature.

The instant invention offers for the first time a radiation portion of about 30 percent of the heat transfer. Such an extremely high percentage has heretofore been achieved only with sheet baffle radiators which, however, are very sensitive to external humidity and because of their steel sheet construction are subject to corrosion and hence short lived, and are made only at small depths.

Even where the advantageous combination of light metal for the heating unit and copper for the heat carrier conduit are used, the heating units are comparably light in weight. This offers great advantages for mounting, particularly for the ever increasing use of tall buildings. The instant construction offers the further advantage of simplicity of assembly, as it is made up of a small amount of parts, which may be made in large quantities in but two devices.

The new heating units and heaters may be joined on one side without danger of a diagonal heating up, which advantage is not found in present day heaters. The life expectancy for the instant heating means is fifty years, as compared to twenty years of present cast radiators, and compared to fifteen years of present steel sheet radiators.

I wish it to be understood that I do not desire to be limited to the exact details of construction shown and described, for obvious modifications will occur to a person skilled in the art.

Having thus described the invention, what I claim as new and desire to be secured by Letters Patent is as follows:

1. In a space heater, for use in heating a space terminated by a building wall, the combination of a series of heating units arranged together in a row and each comprising an upper and a lower heating element spaced apart from each other, said upper and lower heating elements being similar to each other and being heatable, two heat conducting and heat radiating outer walls connected to said heating elements and defining therewith an air chamber common to all the heating units of the series, partition means comprising at least one partition dividing said chamber substantially diagonally into two chamber parts, one of said outer walls being adapted to face the interior of the space to be heated and having in its upper one-third portion air outlet means for said chamber, and the other outer wall being adapted to be disposed near said building wall and having in its lower one-third portion air inlet means for said chamber, each heating element having a hub defining a passage adapted to engage tightly and thereby thermally conductively a tube conducting a heat carrier, said hub being thicker than the remainder of the body of the element, said thickness diminishing with increasing distance from the hub.

2. In a heating unit, for use together with similar heating units in a row forming a space heater adjacent a building wall, the combination of an upper and a lower heating element spaced apart from each other, said upper and lower heating elements being similar to each other and being heatable, two heat conducting and heat radiating outer walls connected to said heating elements and defining therewith an air chamber, a partition dividing said chamber substantially diagonally into two chamber parts, one of said outer walls being adapted to face the interior of the space to be heated and having in its upper one-third portion air outlet means for said chamber, and the other outer wall being adapted to be disposed near said building wall and having in its lower one-third portion air inlet means for said chamber, each heating element having a hub defining a passage adapted to engage tightly and thereby thermally conductively a tube conducting a heat carrier, said hub being thicker than the remainder of the body of the element, said thickness diminishing with increasing distance from the hub.

3. In a space heating unit as claimed in claim 2, said upper and lower heating elements being substantially identical with each other.

4. In a space heating unit as claimed in claim 2, each heating element having solid ribs that are spaced apart from each other and which are heat conductively connected with the respective heating element.

5. In a space heating unit as claimed in claim 2, said partition having a bent shape.

6. In a space heating unit as claimed in claim 2, said partition having a substantially angular shape.

7. In a space heating unit as claimed in claim 2, said heating elements having near said chamber recesses operable to receive and be connected to said outer walls and said partition.

8. In a space heating unit as claimed in claim 2, each heating element being cast of light weight metal, and a tube adapted to conduct said heat carrier through each heating element composed of copper.

9. In a space heating unit as claimed in claim 8, said metal casting being composed of aluminum alloy.

References Cited

UNITED STATES PATENTS

| | | | |
|---|---|---|---|
| 1,861,484 | 6/1932 | Stevenson | 165—129 |
| 1,895,287 | 1/1933 | Lambert | 165—151 |
| 1,998,273 | 4/1935 | Davis et al. | 165—129 |
| 2,011,900 | 8/1935 | Laird | 165—180 X |
| 2,707,096 | 4/1955 | Koopmans | 165—180 X |

ROBERT A. O'LEARY, *Primary Examiner.*

T. W. STREULE, *Assistant Examiner.*